United States Patent
Stern

(10) Patent No.: US 6,612,932 B2
(45) Date of Patent: Sep. 2, 2003

(54) METHOD AND APPARATUS FOR OBTAINING MARKETING INFORMATION THROUGH THE PLAYING OF A MAZE BASED GAME

(76) Inventor: Gregory N. Stern, 130 Barton Rd., Stow, MA (US) 01776

( * ) Notice: Subject to any disclaimer, the term of this patent is extended or adjusted under 35 U.S.C. 154(b) by 0 days.

(21) Appl. No.: 09/908,163

(22) Filed: Jul. 18, 2001

(65) Prior Publication Data

US 2003/0054884 A1 Mar. 20, 2003

Related U.S. Application Data

(63) Continuation-in-part of application No. 09/557,331, filed on Apr. 24, 2000.
(60) Provisional application No. 60/219,274, filed on Jul. 19, 2000, provisional application No. 60/163,229, filed on Nov. 3, 1999, provisional application No. 60/142,097, filed on Jul. 2, 1999, provisional application No. 60/139,947, filed on Jun. 18, 1999, provisional application No. 60/138,210, filed on Jun. 9, 1999, and provisional application No. 60/135,208, filed on May 21, 1999.

(51) Int. Cl.[7] .................................................. A63F 9/24
(52) U.S. Cl. ............................................ 463/42; 705/14
(58) Field of Search .............................. 463/42, 41, 40, 463/16; 705/14, 26

(56) References Cited

U.S. PATENT DOCUMENTS

| | | | | |
|---|---|---|---|---|
| 4,760,527 A | * | 7/1988 | Sidley | |
| 4,798,387 A | * | 1/1989 | Richardson | |
| 4,926,327 A | * | 5/1990 | Sidley | |
| 5,072,381 A | * | 12/1991 | Richardson et al. | |
| 5,351,970 A | * | 10/1994 | Fioretti | |
| 5,449,179 A | * | 9/1995 | Hefferan | |
| 5,624,119 A | * | 4/1997 | Leake | |
| 5,791,991 A | * | 8/1998 | Small | |
| 5,816,918 A | * | 10/1998 | Kelly et al. | |
| 5,823,879 A | * | 10/1998 | Goldberg et al. | |
| 5,857,911 A | * | 1/1999 | Fioretti | |
| 6,012,984 A | * | 1/2000 | Roseman | |
| 6,015,344 A | * | 1/2000 | Kelly et al. | |
| 6,196,920 B1 | * | 3/2001 | Spaur et al. | |

* cited by examiner

Primary Examiner—Michael O'Neill
(74) Attorney, Agent, or Firm—Perman & Green, LLP

(57) ABSTRACT

A system and process is designed to provide a medium for playing sweepstakes style games on the Internet. A standard game medium for decision point based, role playing style games is generated including graphic displays according to a selected theme. The game medium is converted by a game algorithm to a product medium. To generate the product medium, the player is requested to select a series of products from a hierarchy of categories and sub-categories which the player will have an opportunity to win during the play of the game. A player product profile will be generated according to the player's preferences.

8 Claims, 13 Drawing Sheets

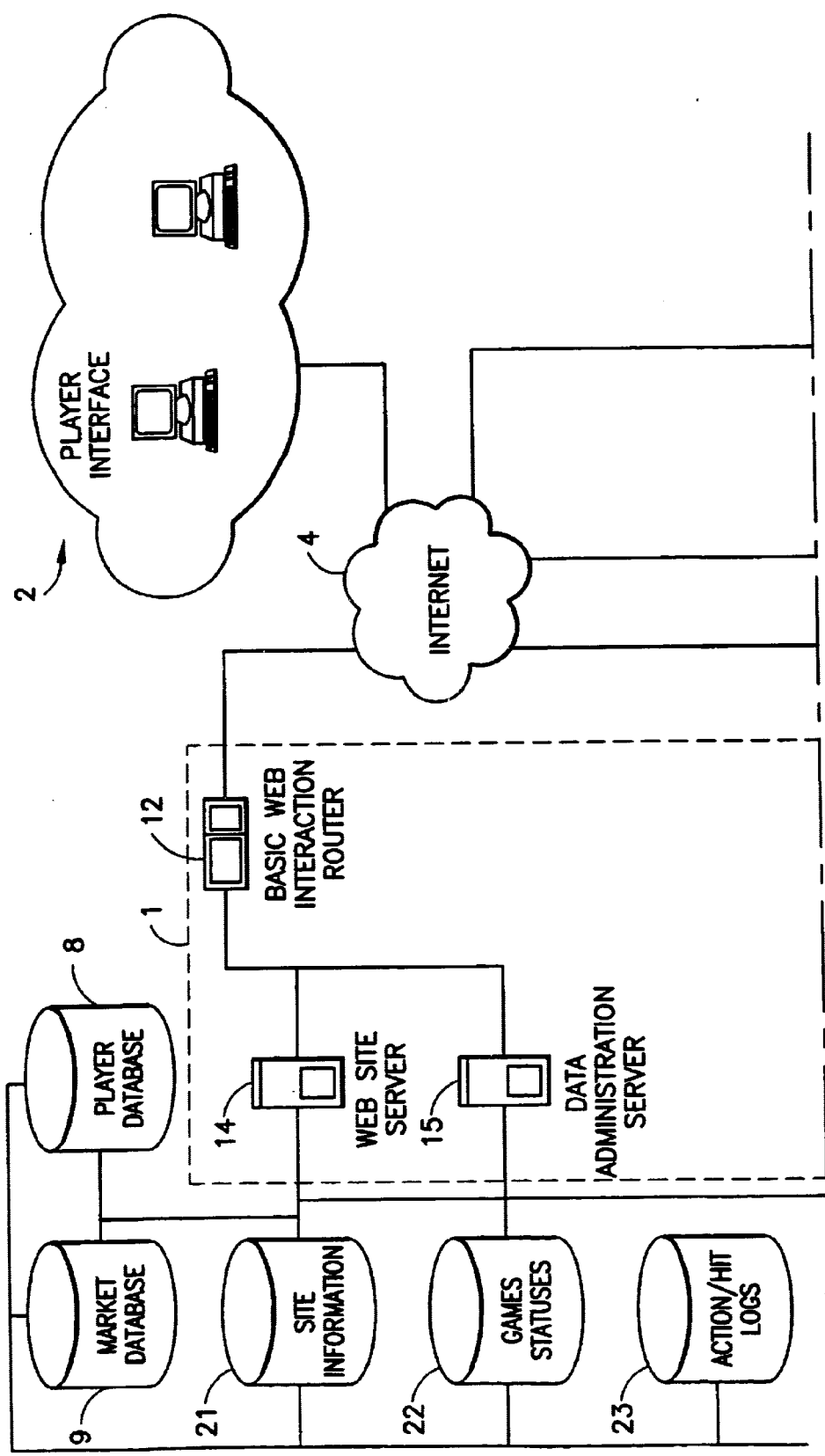

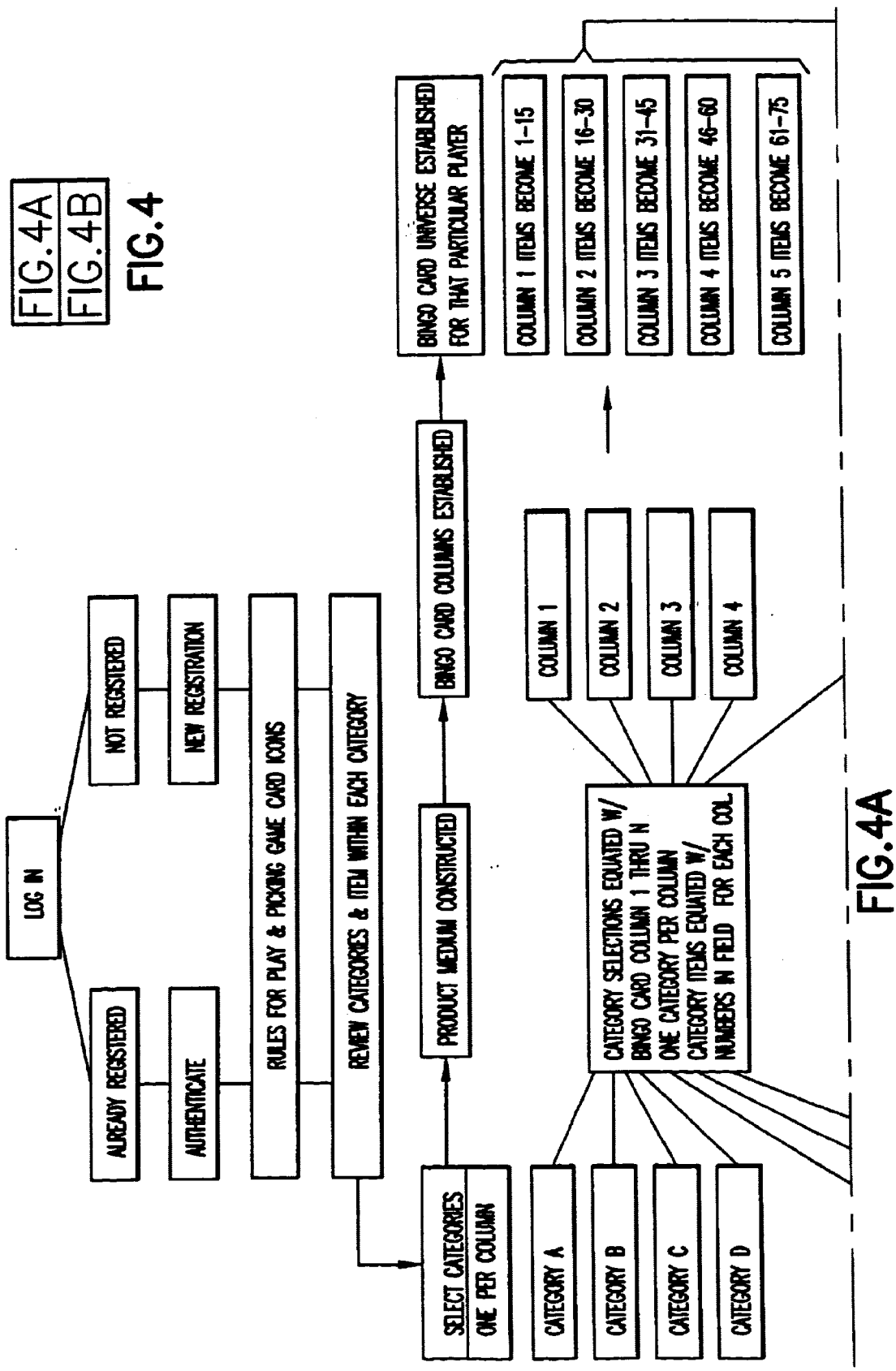

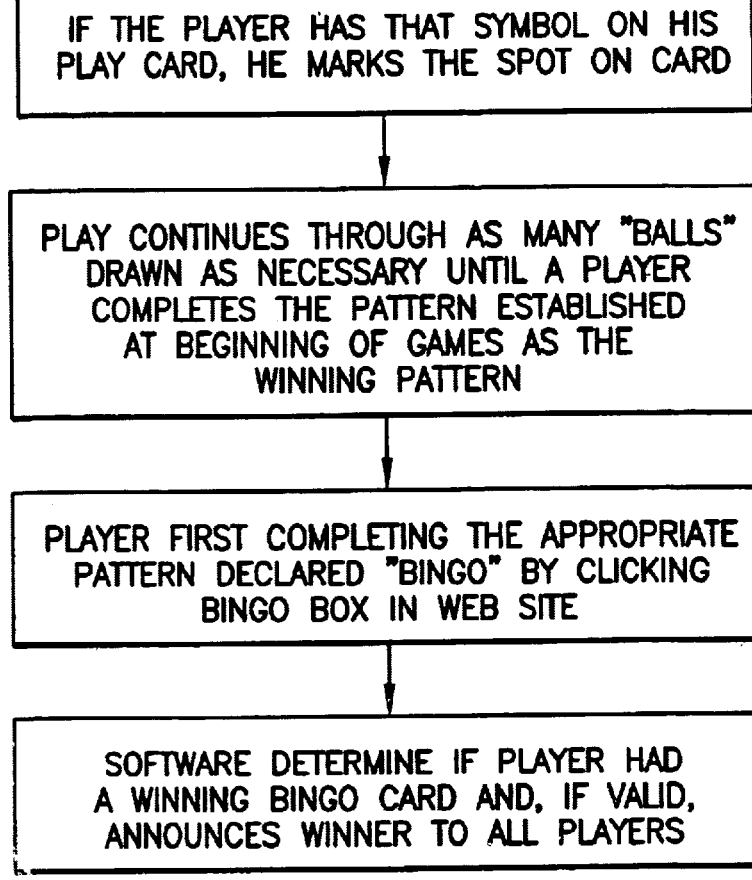

IF THE PLAYER HAS THAT SYMBOL ON HIS PLAY CARD, HE MARKS THE SPOT ON CARD

PLAY CONTINUES THROUGH AS MANY "BALLS" DRAWN AS NECESSARY UNTIL A PLAYER COMPLETES THE PATTERN ESTABLISHED AT BEGINNING OF GAMES AS THE WINNING PATTERN

PLAYER FIRST COMPLETING THE APPROPRIATE PATTERN DECLARED "BINGO" BY CLICKING BINGO BOX IN WEB SITE

SOFTWARE DETERMINE IF PLAYER HAD A WINNING BINGO CARD AND, IF VALID, ANNOUNCES WINNER TO ALL PLAYERS

FIG.5B

CONVERSION TABLE

| COLUMN HEADING | B | CARS |
|---|---|---|
| NUMBER IN FIELD | 1 | TAURUS |
| NUMBER IN FIELD | 2 | MUSTANG CONV. |
| NUMBER IN FIELD | 3 | SABLE WAGON |
| NUMBER IN FIELD | 4 | EXPLORER |
| NUMBER IN FIELD | *** | *** |
| NUMBER IN FIELD | 15 | DEVILLE |

METHOD AND APPARATUS FOR OBTAINING MARKETING INFORMATION THROUGH THE PLAYING OF A MAZE BASED GAME

RELATED APPLICATIONS

This application claims priority from provisional patent application serial no. 60/219,274 filed on Jul. 19, 2000. This application is also a continuation in part application of U.S. application for patent Ser. No. 09/557,331 filed Apr. 24, 2000. The latter application is based on provisional applications, serial number 60/135,208, filed May 21, 1999; Ser. No. 60/138,210, filed Jun. 9, 1999; Ser. No. 60/139,947, filed Jun. 18, 1999; Ser. No. 60/142,097, filed Jul. 2, 1999; and Ser. No. 60/163,229, filed Nov. 3, 1999.

BACKGROUND OF THE INVENTION

A great deal of time and effort goes into compiling marketing information regarding individuals, groups, regions and all sorts of demographic categories. This information is generally obtained by surveying the targeted subjects about their buying behavior or preferences. While surveys produce reasonably accurate results, they are costly and time consuming, and there is no guarantee of accuracy. A reliable method of compiling information is needed that both indicates a reliable preference for a product and if an individual is still a potential buyer. Such a method would be an extremely valuable tool for marketers.

As the use of the Internet proliferates, marketing efforts need to be focused more on an individual, so that the individual can be targeted for specific advertising with a reasonable expectation of a response. There is a need therefore, for a means of obtaining information which originates at the individual level.

One problem in obtaining product preference information is its accuracy. Without any particular incentive, a product preference survey will be fraught with inaccuracies due to the vagaries of the individuals responding. An incentive is needed to promote an honest response. It is a purpose of this invention, to have an individual select a product preference in the context of a possibility of winning the product.

It is a purpose of this invention to provide an Internet user with an attractive mechanism for providing product preference information which is accurate and timely, while engaging in a pleasurable and potentially rewarding activity.

SUMMARY OF THE INVENTION

A game is provided for simultaneous play by a group of users through a real-time interactive network set up on an Internet web site. An Internet server is linked to one or more game servers set up to offer a selection of games that are playable on an interactive basis by individuals or groups. The games are playable by multiple users at the same time. The basic rules of the games presented may be well known, such as bingo, poker, and other playing card games. Each game employs a playing medium such as the tablet in Bingo and the deck of cards in poker. Each individual player sets up a specific reference table of products, i.e., a product medium, selected from a hierarchy of product categories and products, accessible by the game server. The products are potential prizes that may be awarded, in a sweepstakes style contest, upon winning the game.

The game server provides a game algorithm, for example, a matrix, designed to convert the standard game symbols in the game medium, i.e. columns and numbers for bingo or suits and cards for playing cards, to products in the product medium. The product medium is used in the play of the game. In addition the game server provides access to the product lists in a hierarchy of categories and sub-categories selectable by the player. Each game symbol of a game will be correlated in some fashion with a product, a category, or sub-category. In this manner, players may be competing at the same game, but with entirely different selected product symbol arrays. The incentive for making product choices accurately reflecting preferences is the possibility of winning, in a sweepstakes style contest, one or more of the selected products during the course of playing the game. During set up of the game or during play, advertising geared to the individual's selections may be presented to the player by the game server.

A database of product lists and associated advertising and marketing graphics and text is maintained to provide the information required by the player to generate the product medium and to provide the information for targeted advertising during the play of the game.

In the process of setting up a game, each player goes through a hierarchical selection process in which he selects one or more products, categories or sub-categories. In completing the selection process, the player creates a product preference profile that is tabulated and recorded for each individual player. This information is compiled for use in an individual player product preference profile and/or extrapolated into larger, more generic, marketing profiles. Using the player profile, advertisers are provided with a medium to target individuals who have preselected a product. Discounted products, specifically selected to provide an opportunity to meet the personal preferences of each individual player, may be offered directly during the game. Product preference data obtained from the user's selections may be mined, in a marketing sense, in a great variety of ways. The advertiser is reasonably assured that the player has accurately indicated his preferences and has not yet purchased the specific item, because the player has chosen the item in an attempt to win it.

In this manner, a system is devised which provides games that use player prize preference selection to determine and develop a database of consumer product preferences. The selections are incorporated into the play of the game, which is further designed to take advantage of product promotion activities targeted to the player's selected preferences. The player is allowed to compete with other players in the same game using a symbol set unique to each player, while the game algorithm converts back and forth between the selected product symbol set of the product medium to the standard symbol set of the game medium. At the conclusion of a game, a winner is established by rules predetermined for each game variation.

The invention of this application involves the adaptation of the apparatus and method described above to a fantasy style game designed for sweepstakes type contests. The games of this invention are based on a maze scenario, adventure plot or other fantasy script which requires a predetermined number of decision points as the game progresses. The decision points are selected in accordance with the difficulty desired or the planned chance of winning level. Each decision point may have multiple choices which also effect the difficulty and chance of winning. Each decision point and the associated choices provide and opportunity for graphic displays of selected products. The player is presented with a selection of graphic theme's which will govern the graphic displays that are presented. The graphic displays related to each decision point and choice are analogous to the game symbols previously described.

The game medium, therefore, will consist of the graphics displayed at each decision point and choice. The graphics are formatted within the graphic theme selected by the player or the game server. For each player, the product medium, representing the unique product preferences they have indicated, is integrated into the graphic environment. This is accomplished by an algorithm which correlates the individual player's product choices to the set of graphic elements (symbols) specifically allocated for product display at each decision points and/or path choice. In this manner, the product medium is generated, as described above. As before this allows an individual player to customize his own game while playing against other players whose graphic theme and product medium are entirely different.

DESCRIPTION OF THE DRAWING

The invention is described in more detail below with reference to the Drawing, in which:

FIGS. 2a and 2b is a block diagram of the game server architecture of this invention;

FIGS. 4a and 4b is an information flow diagram depicting the operation of the game Bingo as adapted to this invention;

FIGS. 5a and 5b is a chart of the steps used in playing the game of Bingo according to this invention;

FIGS. 6a, 6b, and 6c are illustrations of possible menu screens for use in playing Bingo or cards according to this invention; and FIG. 7 is a table illustrating a possible algorithm for converting a game medium to a product medium.

DETAILED DESCRIPTION OF THE INVENTION

Figure 1:
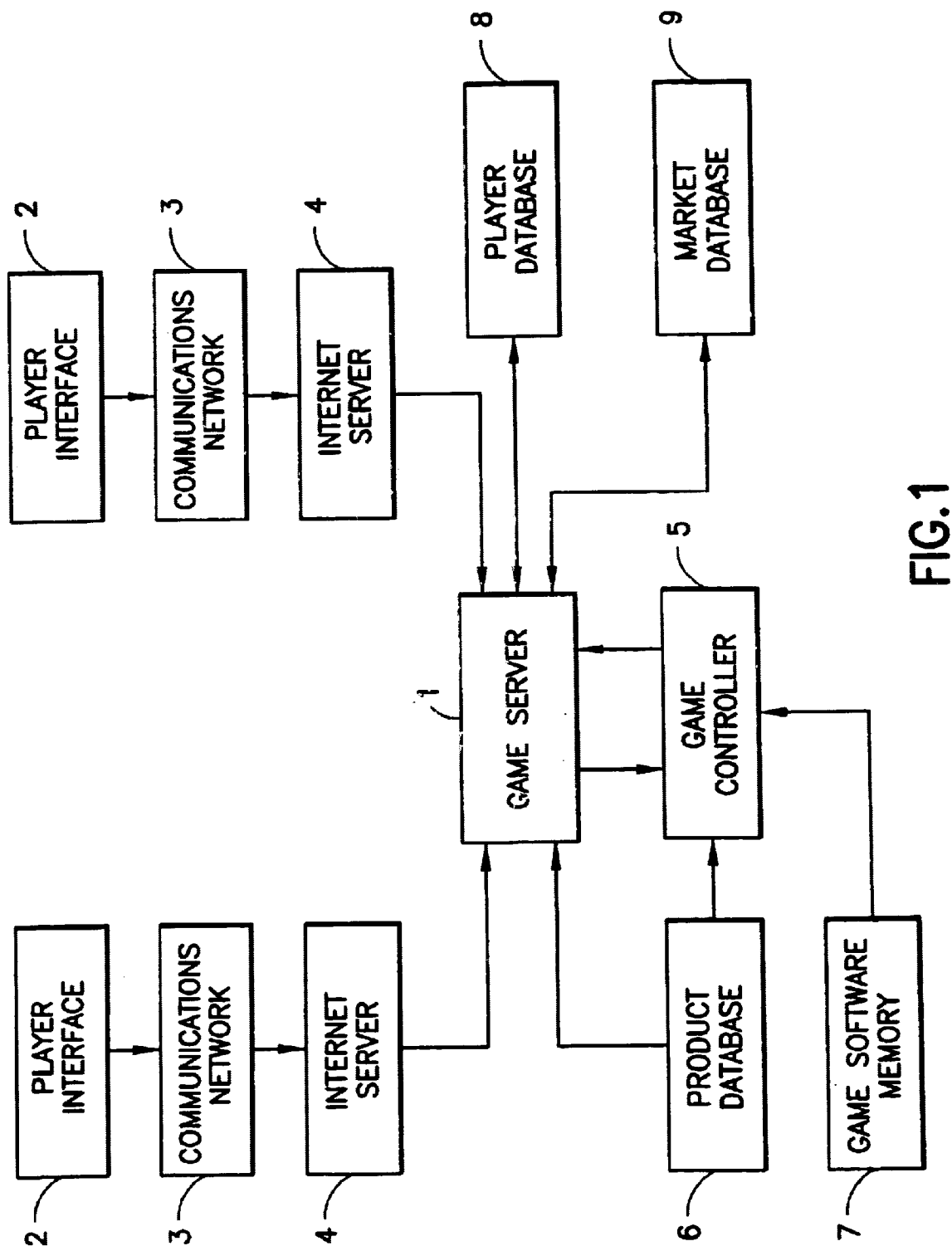
FIG. 1 is 1a block diagram of the system of this invention.

The system of this invention is shown in FIG. 1 and consists of a game server 1, which is accessible by a player through multiple Internet servers 4. The Internet server 4 is accessible in a known manner through a player interface 2 connected through a communications network 3. The game server 1 is constructed to be compatible with a wide variety of Internet, Internet, or extranet servers, but could conceivably be accessible directly by the player interface, depending on the communications network and protocols available. Although this invention is described in the context of an Internet application, it could be adapted for use on an intranet, extranet or other types of networks which employ basic Internet protocols.

Figure 2B:
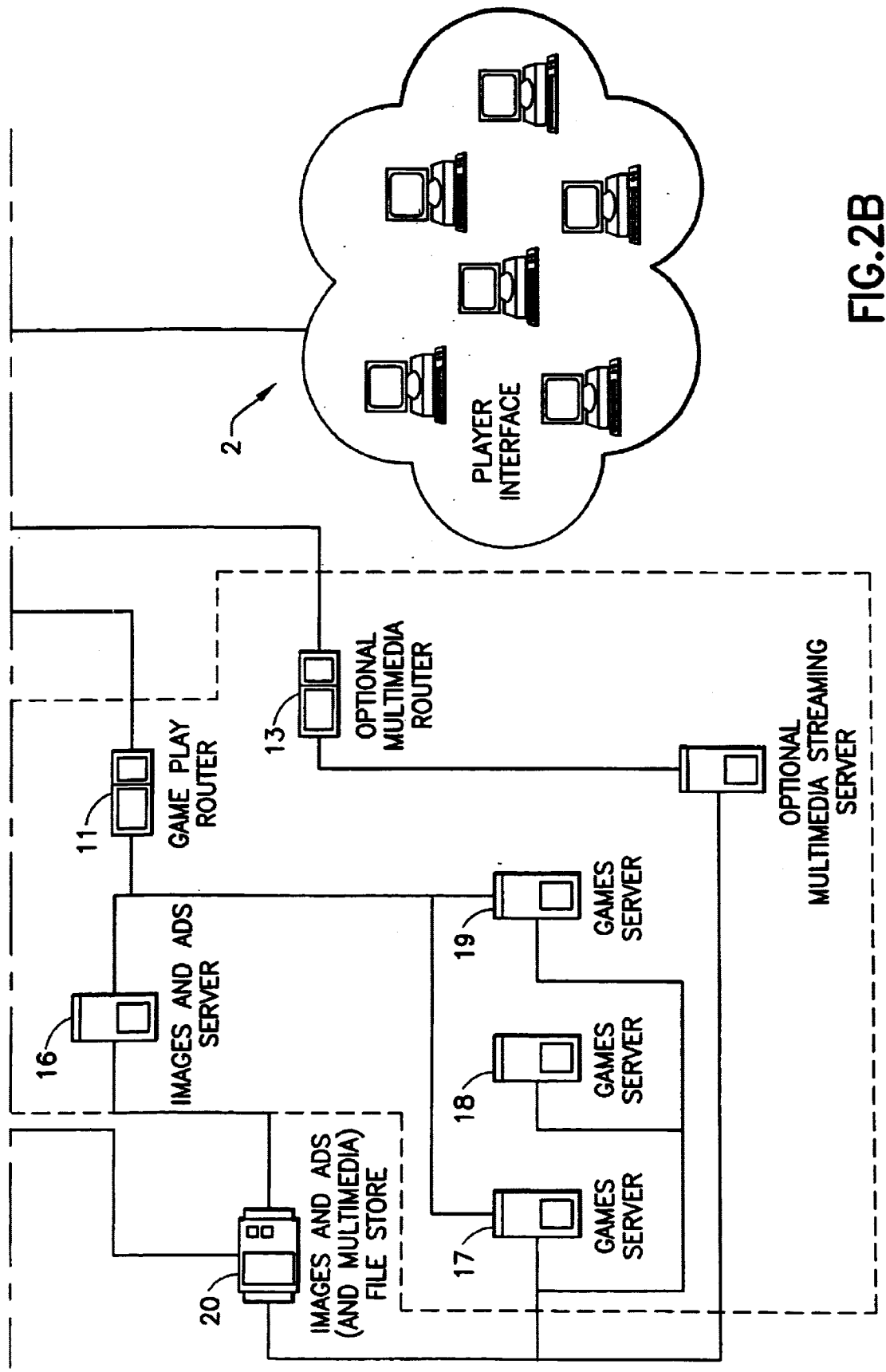

An example of processor architecture which may be employed to construct Game server 1 is shown in FIG. 2. As shown, game server 1 is constructed with a group of game server processor packages 17, 18, and 19 to control game play and related activities. These processors are redundant units which are available for a player depending on the amount of traffic at the site at any time. They are designed to accommodate maximum projected traffic. Each of the game servers 17, 18, and 19 have access to a network file system 20 which provides all of the product data including ads, images, and multimedia presentations if desired. Graphics from the file system 20 are accessible through a separate graphics server 16.

Traffic routers 11, 12, and 13 provide the gateway to the web site on which the sweepstakes style games are available. Traffic router 12 handles the basic interaction for player browsing, registration, and log activities over a normal speed link, through web site server 14. Through router 12, a potential player may access the site information data storage unit 21 to obtain general information about the site and the activities available. A data administration server 15 keeps track of the on going activities of the site for example: the number of hits, game status, and other indications of traffic volume and quality. The personal and generic marketing information provide by the player's product selections is stored in additional storage media. In this manner, specific data storage unit is provided to segregate the data compiled, for example storage media 21 may provide site information, storage media 22 would keep track of on going play, and storage media 23 would track the number of hits and other site activities parameters. In addition generic marketing information may be held in storage medium 9 and player specific information in storage medium 8.

Actual game play would be handled through traffic router 11 over a high speed link to the Internet server. The gateway can take a variety of forms and be accessed through other sites by hypertext or other link. Another high speed link would be provided through traffic router 13 which is designed to facilitate multimedia viewing.

Appropriate log-on menus provide means to identify the player and allow him or her to select a particular game. The log-on process will require basic information about the player to allow compilation of the player data into general marketing information. Specific information with respect to the products selected by the players, interests and preferences will be compiled and stored in a subjective player database 8, while objective data, extrapolated from the subjective data, may be compiled and stored in a general market database 9, shown in FIG. 1. As shown in the more general illustration of FIG. 1, these data are accessible by the Game Server 1 to provide targeted advertising and product offerings. The structure of the databases 8 and 9 may be combined or vary depending on the processors and software employed.

As described above, game server 1 may consist of a series of interconnected processors 14–19 which are selectively operated by associated software to allow the user to play a selected game. Game servers 17–19 are processors which provides the software required for interactive game play by multiple players and the algorithms required to set up the product medium for each game. The game function will be according to the known rules of the game adapted for interactive computer use. Each game will have a game medium for example: bingo tablets, playing cards, and the like. In addition a product medium will be generated from the players selection. The game medium will vary depending on the game and consist of a set of game symbols used in the play of the game, i.e. the column headings and numbers of Bingo and the suits and cards of playing card games.

A game algorithm will be designed to correlate the symbols of the game medium with the symbols of the product medium and convert from one to the other, as required by the play of the game. In some instances, only a look up table or matrix will be necessary as an algorithm to translate a particular game medium. The game algorithm substitutes products for game symbols in the game medium. Game software data storage unit 7 will form part of each game server and will contain the structure of the game medium, including the related symbol set and an algorithm for translating the game medium into a product medium, containing the product symbol set. In addition game process software is supplied to allow the game servers to direct the play of the game to its designed conclusion.

The type and style of player interface 2 depends to some extent on the medium of the communications network, for example, a cellular phone would be used in a cellular system or a cable controller in a cable system. At the present, it is anticipated that the player interface will most likely consist of a personal computer, set up in a well known fashion, to connect to the Internet through a modem connected to land lines. There are many systems competing to provide Internet access including: telephone landline systems, digital subscriber lines, cable networks, cellular networks and others. Whatever communications system 3 is employed, it will have little effect in the basic operation of this invention, except perhaps in speed of interactive play. For the purpose of illustration, it is assumed that the communications system used is the standard telephone line access to the Internet by a modem connected to a personnel computer.

A product database 6 of FIG. 1 will be stored in data storage unit 20 of FIG. 2 and is created to supply product information to the processor for selection by the player. The database 6 will contain a hierarchy of categories, subcategories, and specific products, which will be available for selection by the player for insertion into his personal product medium. The availability of products will vary from game to game. The product database 6 may also contain supplemental information relating to the products, including advertising and marketing information, product offerings and links for access by the game server 1 or processor 5 during the play of the game. This allows the game server 1 to provide targeted advertising and product offerings based on the particular preferences contained in player database 7.

Figure 3:
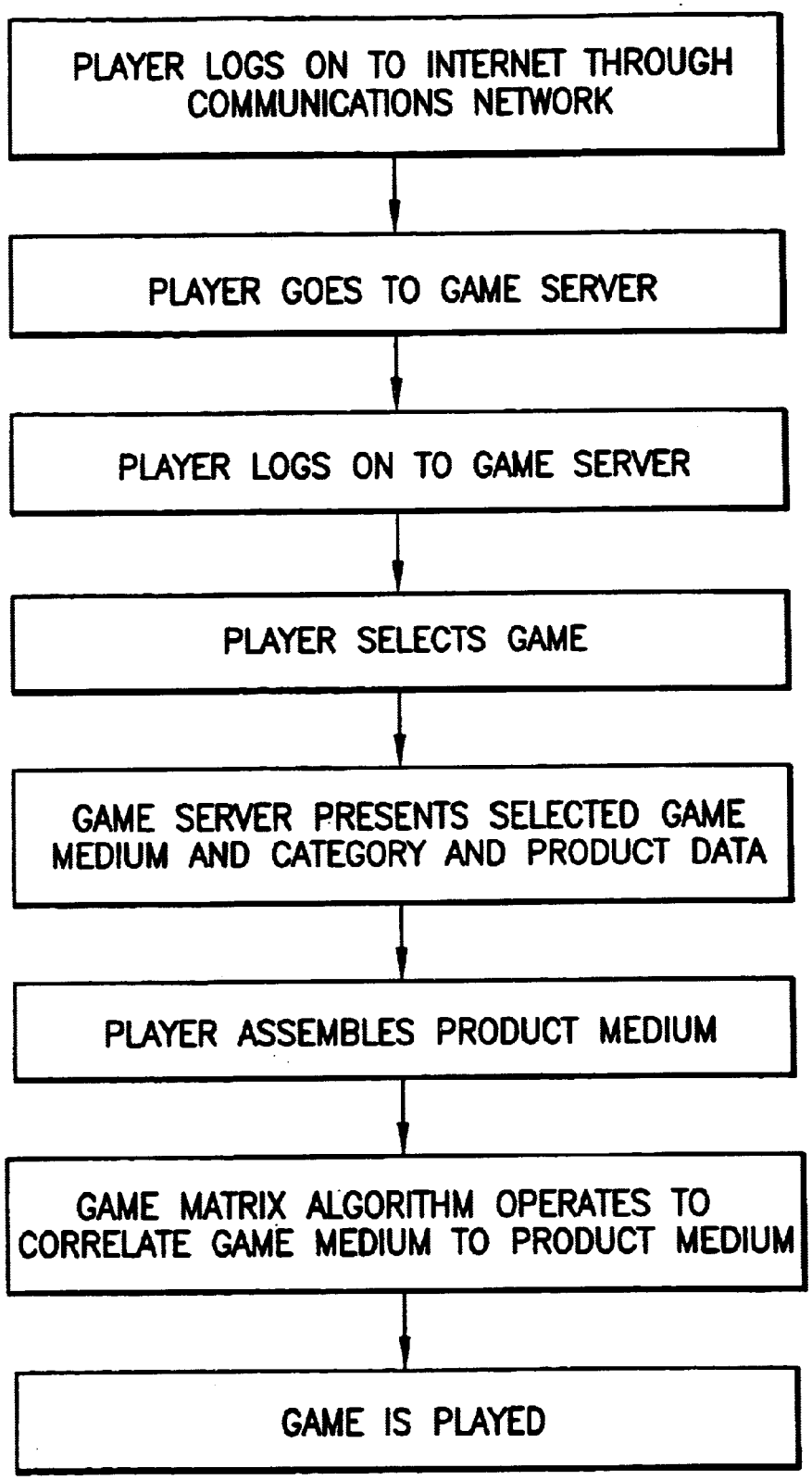
FIG. 3 is a block diagram of the basic process of this invention.

As shown in the process diagram of FIG. 3, the player will access the website, at which the game server 1 is available, by first logging on to his or her Internet server 4 through player interface 2. As stated above, this may be accomplished in many ways and the future holds many more possibilities, but for the purpose of illustration, it is assumed that the game server 1 is accessed in the currently standard manner through a modem and over a telephone land line connection. As is common today, each Internet server has its individual log on procedure and medium for exploring the Internet and providing access to various web sites. The web site of game server 1 may be entered through hypertext displayed in targeted advertising, through selection of the domain name, or other mechanisms for Internet navigation.

Upon entering the game server web site, the player will be prompted by a menu and advised how to select the various paths available. Initially a player identifier file must be created to allow the player to reuse the site with convenient regularity. The player identifier file will also provide the needed linkage to allow marketing data to be compiled directly from the player's activities in the site. Since it is likely that the customer specific data will be very useful in broader marketing efforts, sufficient information needs to be provided to assess the demographics of groups of customers according to selected marketing categories. The game server menu will, therefore, necessarily include a simple form into which the required information will be inserted by the player.

Figure 6A:
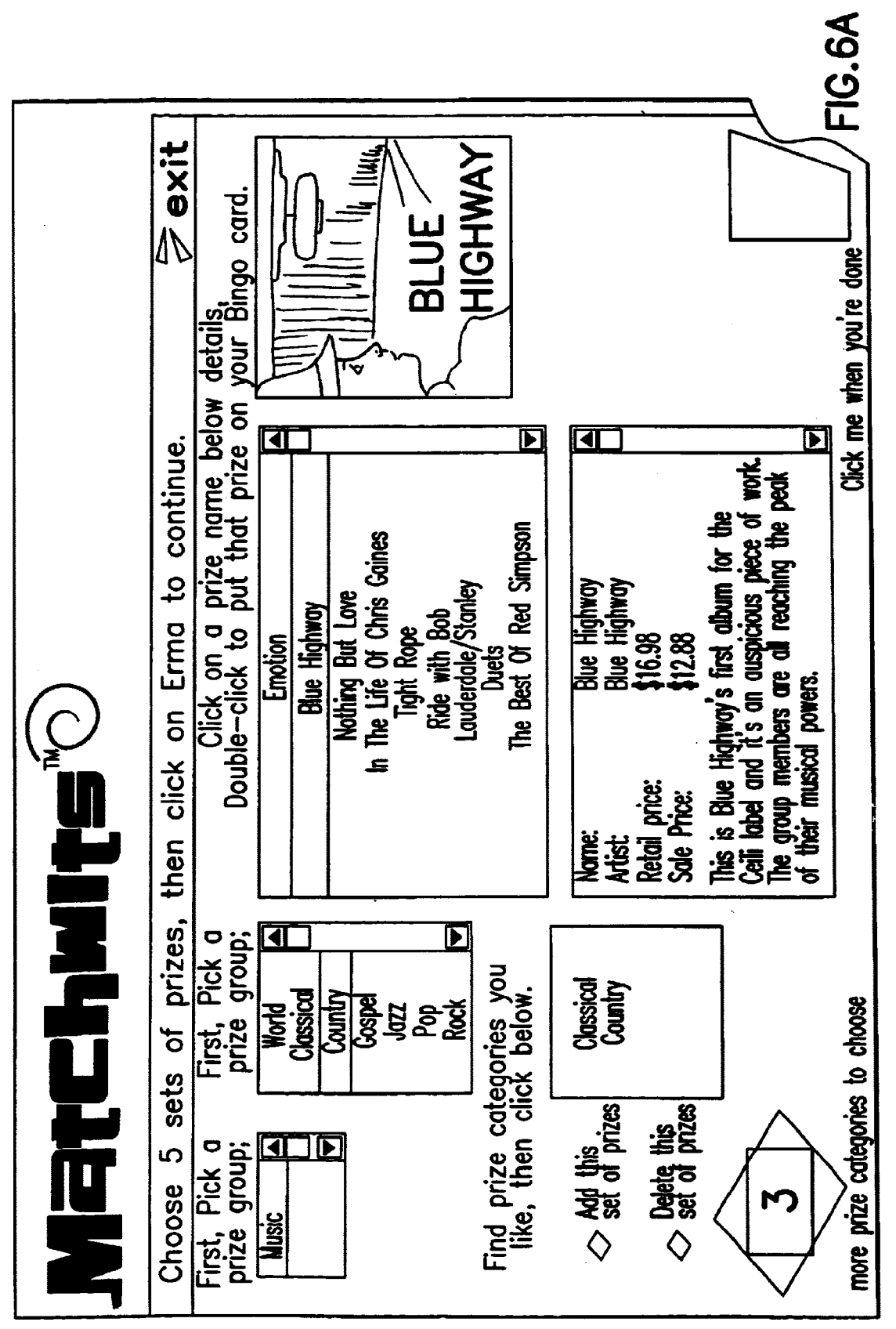

After the player file is generated, it is saved in player database 8 and the player is ready to select a game. The process of game selection will again be menu driven as shown in FIGS. 6a, b, and c and contain access to information about game play. In order to provide an incentive for the player to participate in a straight forward manner, the rules and rewards of winning a particular game will be promoted during the game selection process.

Figure 4B:
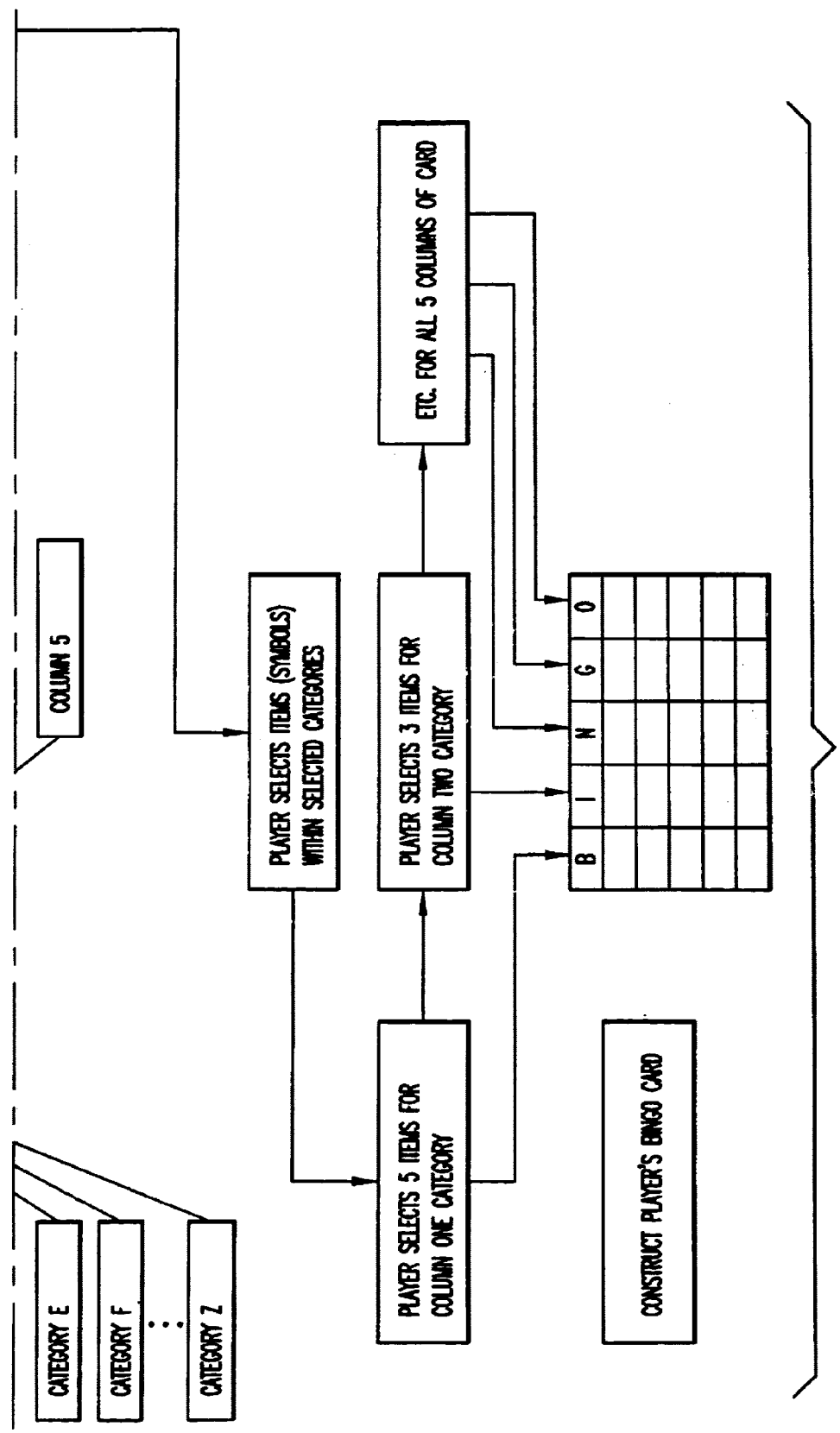
Figure 5A:
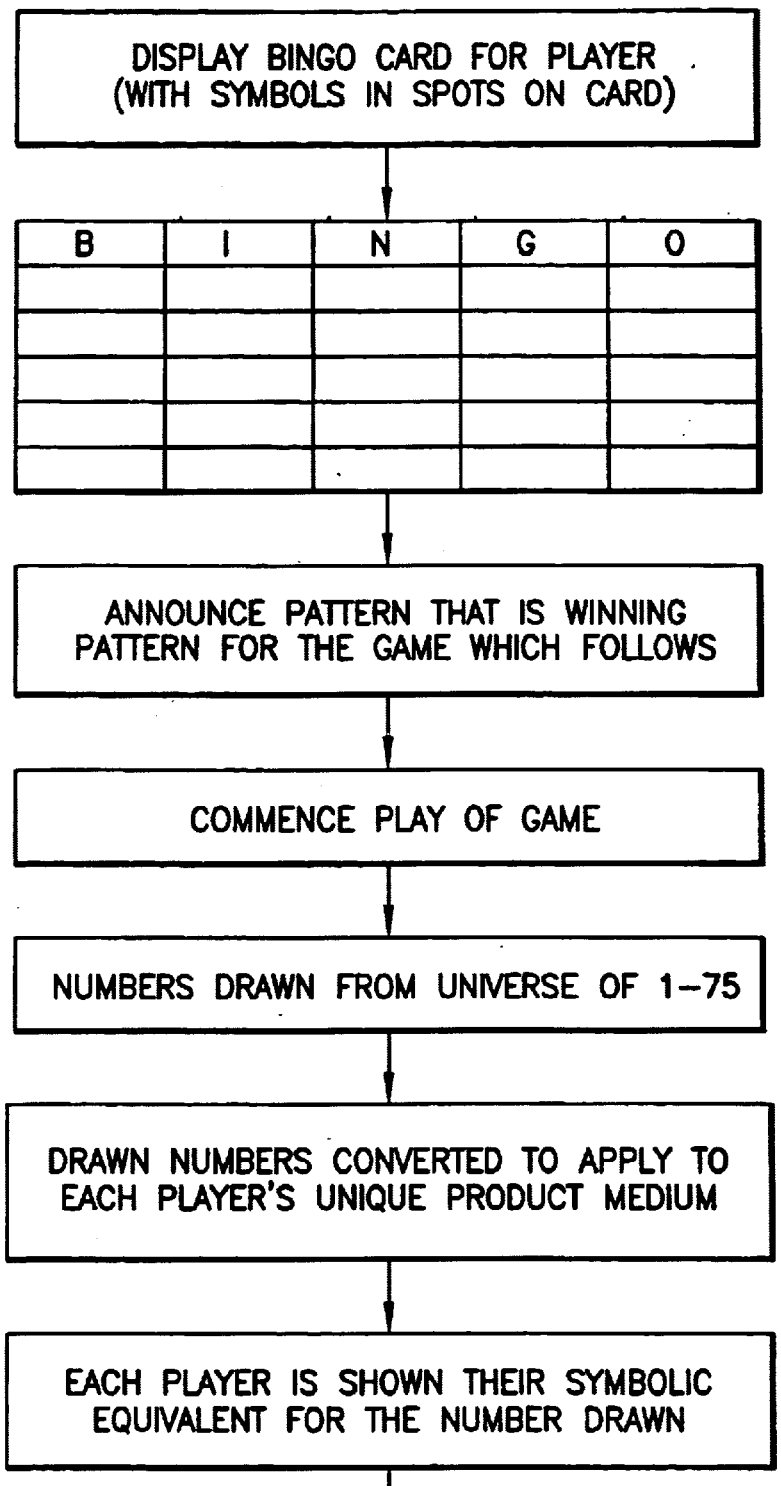

Once a game is selected, a set of game symbols will be displayed which comprises the game medium, as shown for Bingo in FIGS. 4 and 5. This will further illustrate how the game is to be played and the potential rewards. Next it is necessary that the product medium be constructed. To do this, the player must select a preference for a particular product by reviewing the product hierarchy contained in product database 6. The selection may be made at any point in the hierarchy consistent with the game medium. During the selection of a set of product symbols by the player, access will be provided to more detailed product information and advertising in product database 6 to aid in the selection process.

Once the product medium is generated, it is stored in the player database 8 for future reference and manipulation. The game will then progress to a conclusion according to its particular rules and process software. Each game will be different and because of the game algorithm, which converts an individual's product medium into a game medium, multiple players may be playing at the same time using the same game medium, but completely different product mediums.

To accommodate the volume of traffic and facilitate technical control, upon making a choice of games, the player will be assigned to a section consisting of other players for the same game. Each section will be for a particular type of game, i.e. poker, bingo, etc. A minimum number of players will be predetermined for each section to contain the odds at a reasonable level.

The term sweepstakes is used in a broad sense to refer to any contest, other than gambling, in which a winner is selected in a generally random manner, other than just winning a particular game on the game server 1. Depending on the nature of the prizes, the game could be set up to award prizes simply by winning the game played. The key factor is to generate an incentive for players to participate by providing the opportunity to win prizes which the player selects in advance.

The invention will now be illustrated with reference to particular games adapted for the purpose. One game that is particularly adaptable is bingo.

A general process for playing Bingo in accordance with this invention is shown in FIGS. 4 and 5. In the traditional game of bingo, the game medium is the Bingo card or tablet on which numbers are arranged randomly in columns and rows with the columns identified by one of the letters B,I,N,G,O, as shown in FIGS. 4 and 5. There is a universe of numbers used in the game medium ranging from the lowest number in the first column to the highest number in the last column. Normally, there are five columns with fifteen numbers assigned to each column; therefore, the game medium will consist of a set selected from the overall field of 75 numbers, running from 1 to 75. The first column is assigned the field of 1 through 15; the second column is assigned the field from 16 through 30; and so on, until the fifth column which is assigned the field of 61 through 75. Typically, the product medium, i.e., the card is five columns of five rows each. Although the first column consists of the 15 numbers, 1 through 15, only a subset of five of these numbers are displayed on the card in the first column. This process is repeated for each column in order to make a complete bingo card. By constructing bingo cards in this manner, there are hundreds of millions of potential combinations and permutations of cards. Once the card in determined, this product medium is ready for a game to be played.

During the play of the game, numbers are called and the player marks any spots on his card that contains that number. The winner is the first player achieving a predetermined pattern from the numbers called during the course of the game. Other variations may be played with any number of columns and rows, and with a different size field of numbers from which to construct the cards.

Bingo is adapted, according to this invention, by substituting a set of symbols representing products for the traditional set of numbers displayed in each spot on the bingo card. Similarly, the traditional column headings of "B, I, N, G, & O" can be replaced by categories of products. The game can be designed for play with any number of columns and rows, with or without freespaces.

Figure 6B:
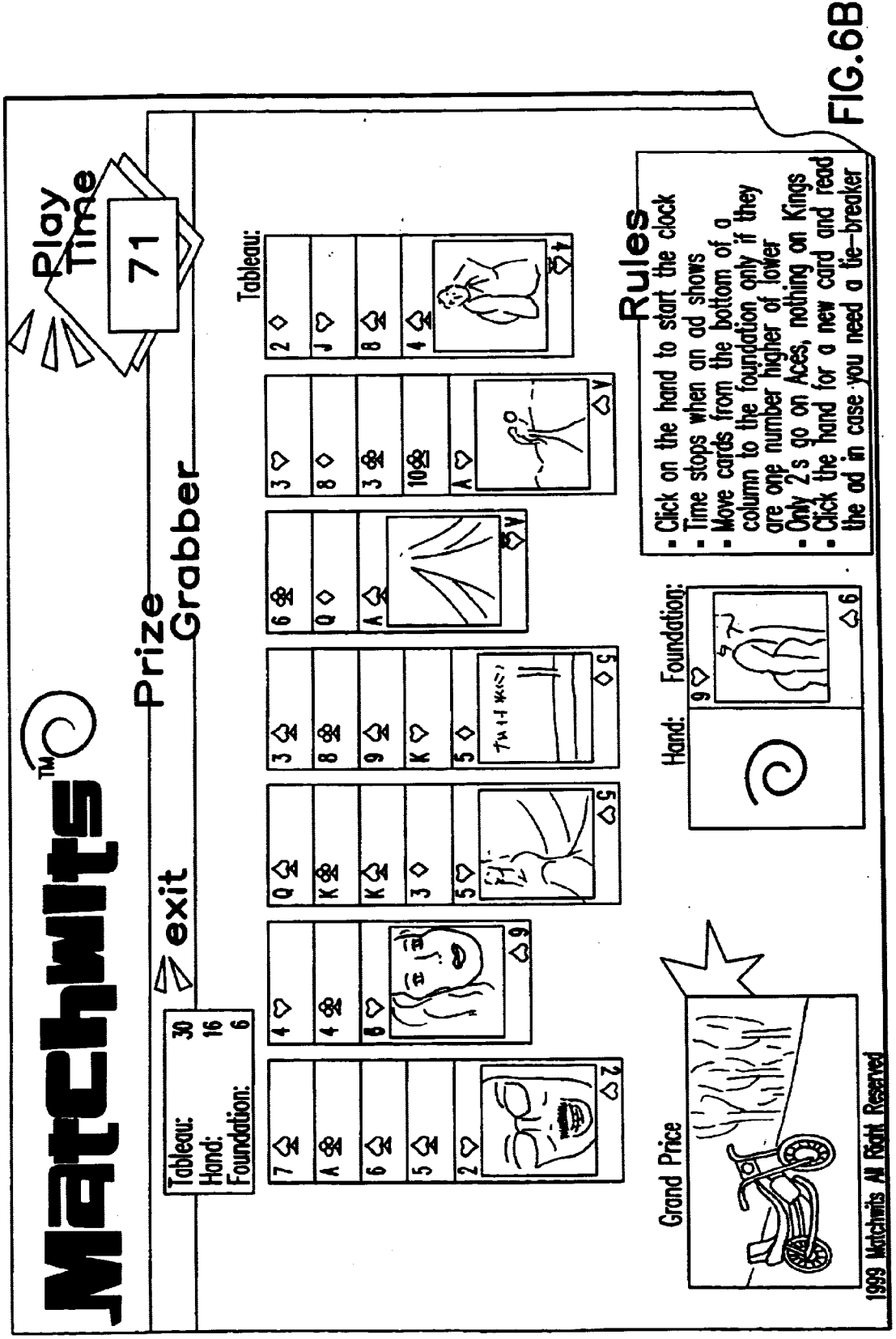
Figure 6C:
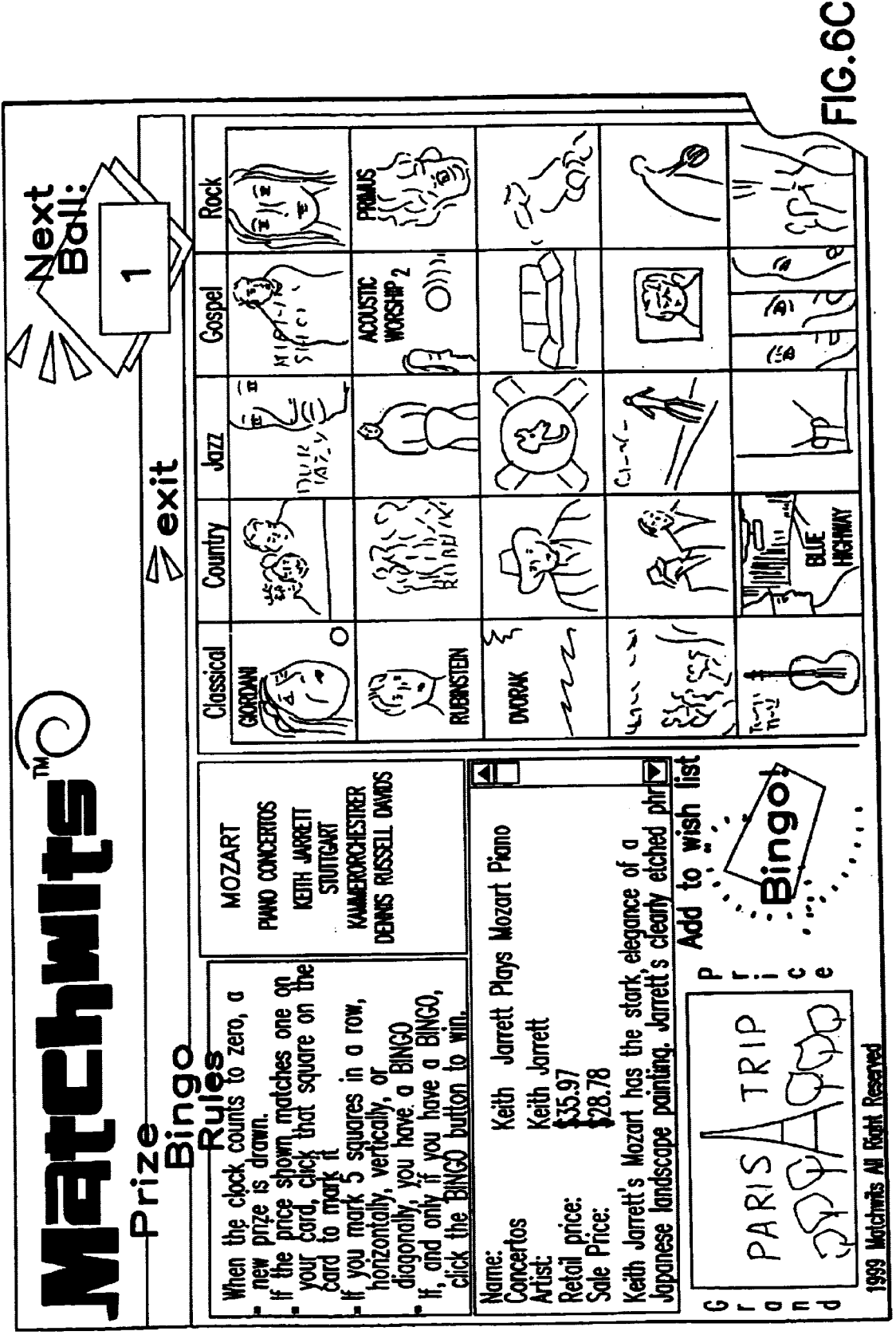

In order to generate a product oriented medium, the game medium, i.e. the bingo card, containing a set of numbers, is converted to a product medium with the traditional numbers replaced by a set of product symbols selected by the player. The column headings would be replaced by categories of products, thereby structuring the hierarchy of the selection process. To accomplish the conversion, a game algorithm is devised for making the conversion. For example, using the traditional bingo card format of five columns of five rows, the first column, or "B" column, can be chosen from a field of 15 products within a category which are assigned numbers from 1 through 15 by the player or automatically by selection of a category. A second field of 15 products are chosen for the second column, or "I" column, and are assigned the fifteen numbers from 16 to 30. The process continues until the available numbers are replaced by products. From each field five products are chosen to be displayed in the spots on the bingo card. The game processor would operate in accordance with the game algorithm to convert back and forth from the game medium to the product medium as the game progresses. In the context of the game Bingo, the algorithm is a simple look up table, as shown in FIGS. 6c and 7, in which the columns of the game card are correlated to categories and the set of numbers for the game medium are correlated to the set of selected product symbols for the product medium.

As shown in the example of FIG. 7, the "B" heading of the first column could be converted to the word "CARS" and the set of numbers in the first column could be associated with, i.e. substituted for or used with 15 names or images ("symbols") of different models of cars. The first column of the bingo card would then consist of the appropriate number of spots filled with the names or images of cars chosen by the player or chosen at random. In a five by five bingo card, there would be five car "symbols" filling the first column. The Bingo game algorithm would convert the numbers to product symbols and back as shown.

A similar conversion table would be utilized for each column and column heading selected by the player. A formula for assigning numbers to the products in each category selected for a particular column would read as follows:

Each "symbol" in each category is assigned a unique number (X) in its field of 1, 2 . . . n where n is the total number of "symbols" in each category. To determine that "symbols" number (N) in the universe, you would use the following formula:

$$N=X+(C-1)*n, \text{ where C is the number of the column to which the category is assigned.}$$

In the most common five column, five row game of bingo with a universe of 75 numbers, the first product in the category assigned to third column would have a range number of 1 and a number in the universe computed as follows:

$$N=1+(3-1)\ 15=31; \text{ where } C=3, n=15, \text{ and } X=1.$$

The game algorithm would enable a player to select from a variety of categories and place those categories in whichever column he/she prefers. It also enables the player to select the products that will make up his unique card. Since the content of the product medium is selected according to each players preference, each of the players will play with diverse sets of product symbols and categories while the game algorithm converts each of the product mediums back to the game medium, the universal bingo game card. The players therefore, compete in the same game with different cards. For example, player X may have designated his first column to be "Cars" with the Ford Taurus being equated to the number "1" in the algorithm for this card and player Y may have designated the first column to be "Jewelry" with an opal ring being equated to the number "1" in the algorithm for her card. During the play of the game, if the number "1" is chosen, determined by a random number generator or manual draw, player X would be shown the product symbol for the Ford Taurus and player Y would be shown the product symbol for opal ring. Each would appropriately mark their cards in the same square of the product medium. To facilitate the play of the game, the number may be shown in conjunction with the appropriate product symbol on the product card. If one or neither have chosen the product symbol correlating to the randomly selected number, the square on the product medium would not be marked, since it would not be displayed on their bingo cards.

The pattern necessary to win is presented before the beginning of the game. As numbers are drawn by the random number generator, they are converted to the appropriate product symbol via the game algorithm. They are then displayed for the players in their product medium form. While the game is underway, the player views his tablet and highlights the appropriate spot. The winner of the game is the first player to achieve the predesignated pattern and signal "bingo".

As the player opens the menu for the bingo game that he has selected, a series of preferences must be made to fill out a set of products in which the player is interested in winning. The player chooses category, subcategory, and product symbols to generate a product preference database for the game of bingo from which the product medium for each player is selected.

From the illustration of the use of the process and apparatus of this invention in the context of a game of bingo, it is observed that the subject invention provides a methodology for delivering advertising, appropriate to the individual audience, after gathering preference data directly from the individual. Player preference data obtained from one of the several games available on the game server 1, provides an accurate mechanism for monitoring consumer preference. By permitting the consumer to choose prizes that will be awarded as part of a competitive game situation, the consumer indicates that he or she would like to win that product and, in all likelihood, that, they do not already have the product. Over time, the data on prize choices permits the compilation of preference vectors based on comparative preferences among potential prizes. With this information, from the player database, opportunities arise during the set up, play and between game interludes for directing advertising to the player, targeted to the stated preferences.

Another embodiment of this invention adapts the use of playing cards for the purpose of encouraging a player to volunteer product preference data. Decks of playing cards have been around for centuries. During that time, hundreds of card games have been invented which use decks of cards in one form or another. Variations on the playing card deck include, but are not limited to, the standard poker or bridge deck of 52 cards with 13 cards in each of four suits; the 48 card pinochle deck with two each of nine through ace in each suit; the 32 card euchre or skat deck with one each of 7 through ace in each suit; and the 64 card bezique deck which is essentially a double euchre deck.

Through the process and apparatus of this invention, any card game can become both a promotional event for advertisers and an opportunity to win sweepstakes prizes for players of those games. With this invention, everyone with access to a game can be both entertained and compete for prizes. Everyone can play and everyone can be an actual contestant with an opportunity to win the prizes offered.

The game medium of games using playing cards consists of the suits and cards themselves. The suits of playing cards are associated either at random, by player selection, or by advertiser selection with classes or categories of products such as CDs, videos, movie passes, restaurant gift certificates, books, books on tape, cosmetics, etc. For example, CDs may be associated with spades, books with hearts, cosmetics with clubs, and videos with diamonds. Each of the thirteen cards of the standard deck can be specific products in each of the categories. The product and category list are stored in the product database 6 and are accessible to the game processor 5 and Game server 1. The player may select the category and product, just the product, or it may be presented by an advertiser. Once the associations are made, a game algorithm is constructed that is unique to that particular deck of playing cards. The game algorithm converts the game medium, the playing cards, to the product medium similar to the process used in the bingo version of this invention of bingo. An example of a game of solitaire using a CD related product medium is shown in FIG. 6b.

In order to add variety to the playing of the games according to this invention, the game server 1, through one of its processors, such as data administration server 15, is programmed to keep track of the number of games played on a particular product medium in storage medium 23. After a predetermined number of repetitions, the player may be prompted to consider different categories of products. This can also be done automatically to test the player's preferences in other categories of products.

As an illustration, after a predetermined cumulative number of cards are played in consecutive games, the game software can call for a replacement deck. In selecting the replacement deck, (either by player choice, random selection, or advertiser selection) categories, previously used in association with suits for that particular player, are no longer available, thereby avoiding additional repetitions of an advertiser's product promotion to that particular player. If categories are player selected, the categories available to that player might no longer show the categories he had previously chosen.

The above described methodology works well with games that are well known, but is also adaptable to more imaginative games that require the player to pass through certain decision points which are arranged in the context of a maze scenario, an adventure plot, or other role playing, fantasy style script. The object of such games is to make it through the maze or through the script as efficiently as possible. Each decision point becomes a marketing opportunity and ads can be presented according to preselected product categories. The graphics of this type of game become a more complex and important part of game play and provide opportunities for presenting product related information and graphics. Accordingly, the player, is provided with a selection of graphic themes which will govern the displays provided.

In this instance the game medium would be formulated in terms of each decision point 100 and the choices 110 to be made at each decision point 100. Instead of game symbols, as in previous versions, the game medium is based on the graphic displays presented at each decision point 100, including the available choices 110. The product medium is comprised of categories and products selected by the player and correlated to each decision point 100 and choice 110 in the associated graphics. The game algorithm varies according to the nature of the maze, scenario or script and the selected graphics theme. The game algorithm, as in bingo and other games, would convert the generic decision point structure of the game to a product structure, which enables individuals to compete with others while playing their own customized game. This means that the graphic displays are correlated to the selected products to provide the product medium.

In this group of games, the game medium could be designed, for example, with a series of decision points 100 having four choices 110 each. This creates numerous display opportunities for which displays may be provided according to the theme selected by the player. The game algorithm would correlate the graphic displays of the decision points 100 and choices 110 to categories and products selected by each player. The odds of completing the game in ten steps would be about a million to one. In a multiplayer game, in order to structure the game to have a consolation prize winner among a group of 250 players, you could use five correct decisions in a row after the tenth decision point to determine the non-grand prize winner. The odds of completing five correct moves in a row with four choices per decision point are one in 1024. If there are 250 players, four additional moves after the tenth decision point reduce the odds to 4 in 1024 or about one in 250. Therefore, the game should end in about 14 moves. The winner or winners after the tenth move will be given a prize associated with the products that they have selected. If the proper decision were made for all ten initial moves, the winner would win the grand prize. If no player chose the first ten moves correctly, the seventh through eleventh moves would determine if there were a game winner after the eleventh move. If no player made those choices correctly, the eighth through twelfth moves would be used to determine a winner, and so on.

Figure 9:
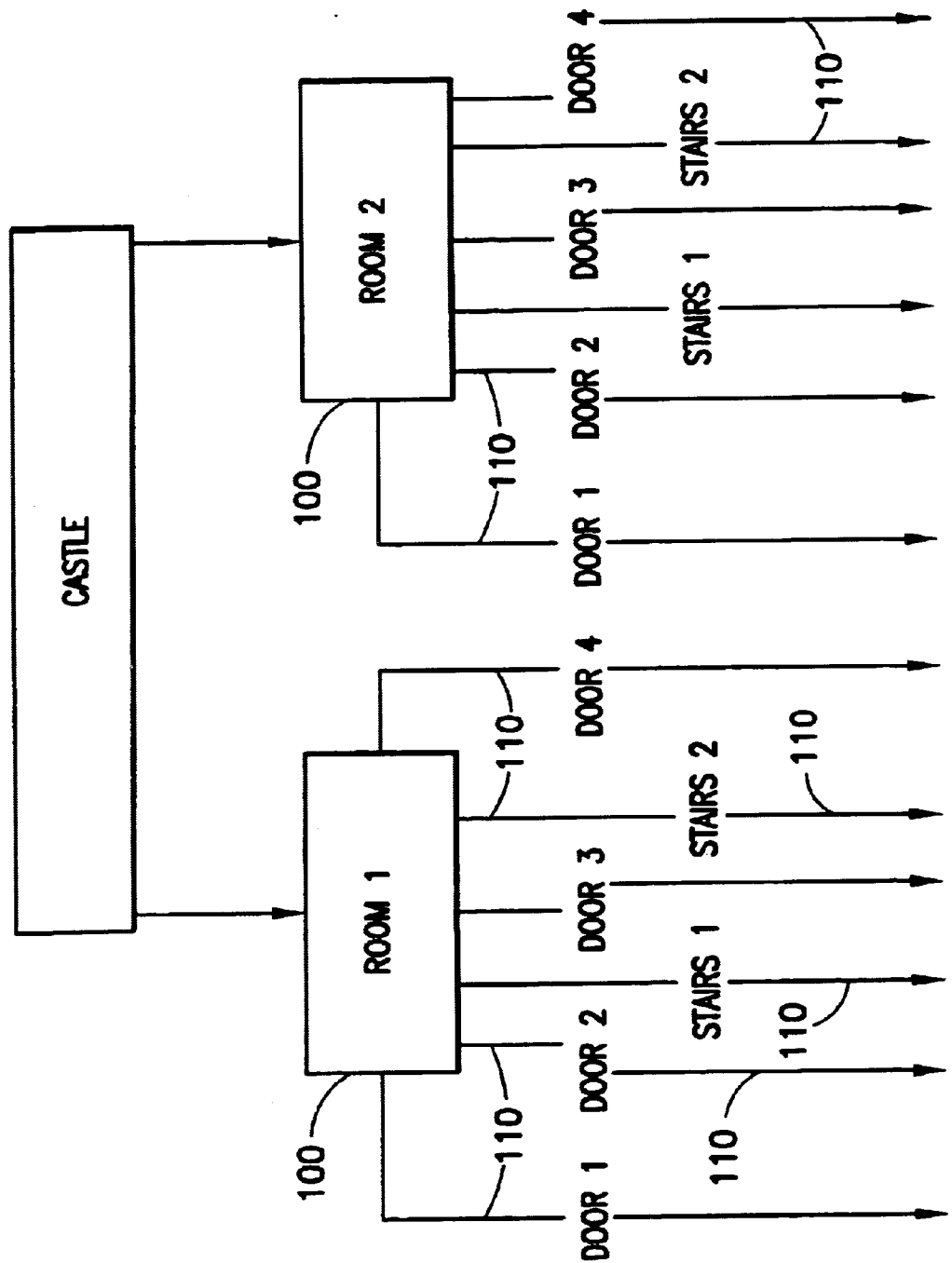
FIG. 9 is a diagram of a maze type decision point style game in a castle environment.

Using a maze as an example, the maze may consist of N choices 110 at each decision point 100 and X number of decision points 100. Therefore, the odds of winning in the minimum number of steps are determined by the formula odds=$1/N^x$. For example, let's assume, as shown in FIG. 9, that the maze consists of connected rooms in a castle. If you have the choice of four doors and two sets of stairs after you have entered each room and the minimum number of rooms to find the objective is ten rooms the odds of finding the objective after only ten rooms is $1/6^{10}$. By tying the grand prize to the minimum of steps to complete the maze or achieve the objective, the game server can set the odds of winning that prize by adjusting the number decision points and the number of choices at each decision point. The game algorithm would be adjusted accordingly.

A game would end when the first player achieves the prescribed number of correct choices. Tie-breaking rules would be used to decide the winner when ties occur.

Figure 8:
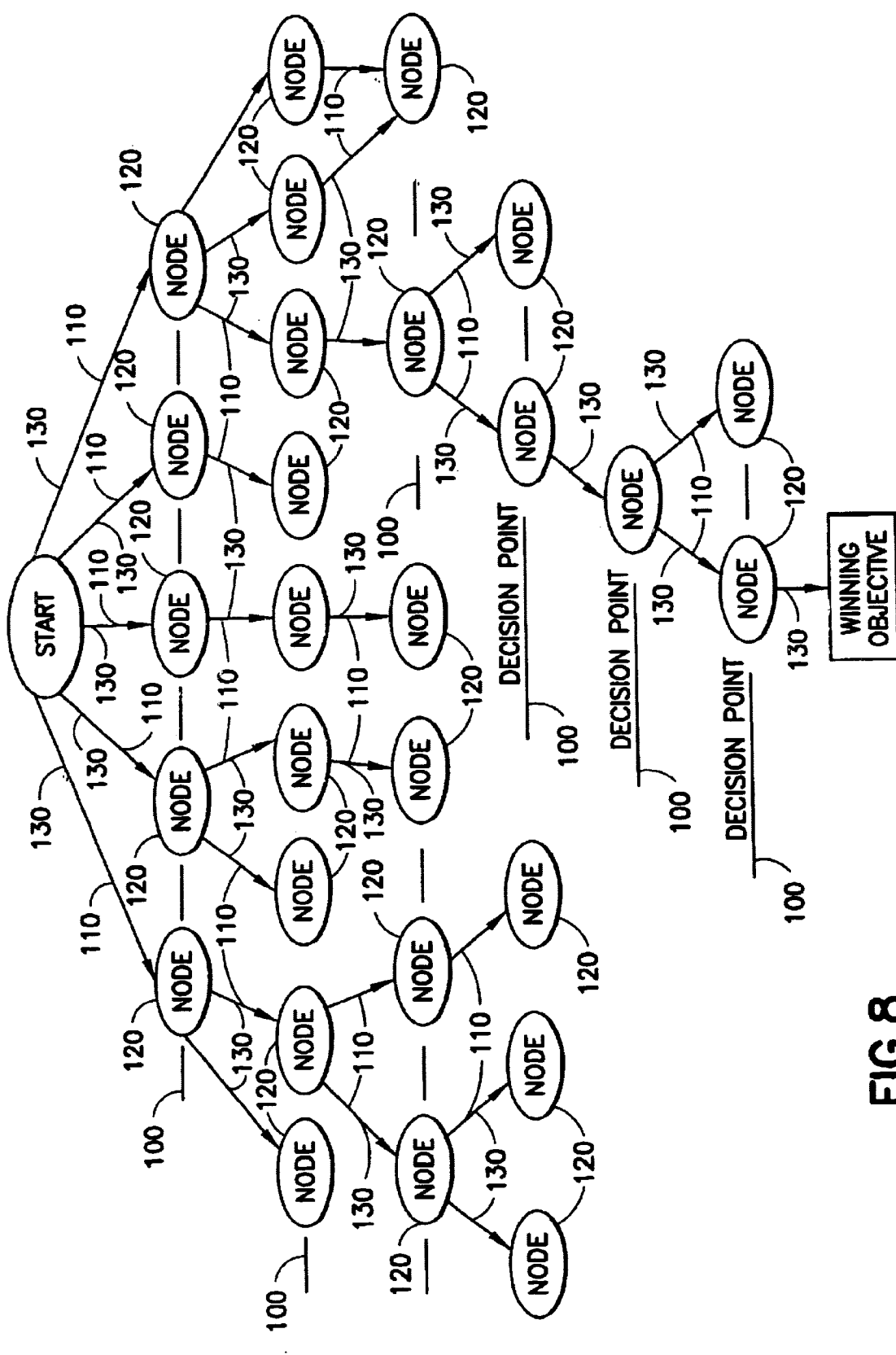
FIG. 8 is a diagram of a decision tree showing a decision point style game.

As shown in FIG. 8, the decision points 100 and choices 110 are analogous to a decision tree, that consists of nodes (circles) 120 from which emerge branches (lines) 130. These form the skeletal structure, i.e. the game medium of a maze or other similar game. The number of nodes 120 and the number of branches 130 coming from each node 120 determine the odds of landing on the node 120 that symbolizes the winning objective 140 in the game of FIG. 8. Working within this skeletal framework and using a broad bandwidth computer-based technology, like the Internet, each player is offered a selection of graphical environments or themes to create different role-playing, decision point based games around identical game medium frameworks. The graphic displays in a game would reflect the chosen graphic theme.

For example, if a game involves a castle environment in which an objective is to find a princess locked in a tower, the same game could also be offered in a wilderness environment in which the objective is to find a cave containing hidden treasure in a dense forest. Within the same game structure, two product categories from which players select, may be provided, for example, camping gear and books. Player A selects a wilderness environment with books as prizes; player B selects wilderness with camping gear as prizes; player C selects the castle with books as prizes; and player D selects the castle with camping gear as prizes. Even in this simplified version, each player has a unique game because each individual player will select a theme for the game and the products preferred. The graphic displays presented will vary according to these selections. Furthermore, after the first node they all begin to diverge on different paths within the decision tree. Using a numbering system geared to the number of choices offered at each node, in the second example above, it would be a base 4 numbering system of ten digits, one could create one correct number of ten digits that would get you to the only grand prize objective. As in other types of games the game algorithm will convert the game medium, consisting of the decision point and choice set with the associated graphic display set, to a product medium and visa versa so that each player can compete under the generic game medium structure, while experiencing an exposure to a different variety of product presentations.

While player A is finding books along the way as he wanders in the woods, player D is seeing camping gear in each room in the castle that he passes through during his game. But if their choices after three decisions were numerically represented by 412, they would be at the exact same point in the underlying game medium. The odds of both players being at the identical point after three moves are about one in 64.

The game algorithm is designed to correlate the graphic displays associated with the decision points and choices of the game medium with the products selected for the product medium and convert from one to the other, as required for the play of the game. In some instances, only a look up table or matrix will be necessary as an algorithm to translate a particular game medium. Game software data storage unit 7 forms part of each game server and will contain the structure of the game medium, including the related decision point set graphics and an algorithm for translating the game medium into a product medium, containing the product set. In addition game process software is supplied to allow the game servers to direct the play of the game to its designed conclusion.

According to the above, a unique method of obtaining an honest, straight forward, statement of product preference by an individual is provided. The process is incentivised for the player by providing product selection from a list, which are potential prizes to be won in a sweepstakes style contest. It should be understood that the system and method may be implemented in a wide variety of configurations, styles and media and variations may be used within the boundaries of the invention as described in the claims.

I claim:

1. A method of playing product oriented role playing games for prizes on the Internet using a player interface connected through a communications network to a game server on which is resident game algorithms for playing decision point style games, said method comprising the steps of:

connecting the player interface to the game server through the communications network;

presenting to the player at least one game in which the player may choose to compete, based on sequential decision points having multiple choices at each of said decision points;

prompting the player to select a game to be played storing a game medium for use by said game server, said game medium arranged in a structure having a set of graphical displays for each of said decision points and choices according to the rules of the selected game;

providing a product database having a listing of potential prizes from which the player may select;

creating a product medium having the same structure as the game medium by having the player select products from said product database for insertion into the game medium structure, said product medium having product symbols representing products selected by the player correlated to said graphic displays;

providing a game algorithm for each player for converting said game medium into said product medium;

using the game algorithm to convert the game medium to the product medium, based on the products selected; and playing the role playing game wherein said game server plays the game according to the game medium, while the player plays the game using said product medium and wherein said game algorithm converts between said product medium and said game medium during said play.

2. A method of playing product oriented role playing games for prizes on the Internet using a player interface connected through a communications network to a game server on which is resident game algorithms for playing decision point style games, said method, as described in claim 1, wherein the product database includes a hierarchy of categories, sub-categories, and products and wherein the set of decision points and choices are correlated with a selected category, sub-category, or product by operation of the game algorithm.

3. A method of playing product oriented role playing games for prizes on the Internet using a player interface connected through a communications network to a game server on which is resident game algorithms for playing decision point style games, said method as described in claim 1 wherein the decision point style game is based on a maze.

4. A method of playing product oriented role playing games for prizes on the Internet using a player interface connected through a communications network to a game server on which is resident game algorithms for playing decision point style games, said method as described in claim 1 wherein the set of decision points and choices comprises a multiple branched decision tree structure.

5. A method of playing product oriented role playing games for prizes on the Internet using a player interface connected through a communications network to a game server on which is resident game algorithms for playing decision point style games, said method as described in claim 1 wherein the set of decision points and choices is associated with a series of product oriented graphic displays and said graphic displays are incorporated into said game medium.

6. A method of playing product oriented role playing games for prizes on the Internet using a player interface connected through a communications network to a game server on which is resident game algorithms for playing decision point style games, said method as described in claim 5 further comprising the steps of:

providing a series of graphic themes for said graphic displays; and selecting a graphic theme for use in playing the game.

7. A method of playing product oriented role playing games for prizes on the Internet using a player interface connected through a communications network to a game server on which is resident game algorithms for playing decision point style games, said method, as described in claim 1, wherein multiple players may compete using the same game medium with different product mediums and different graphic schemes.

8. Apparatus for playing decision point style games for prizes on the Internet comprising:

a player interface having the capability of connection to a communications network to send and receive information;

a communications network available for bi-directional communication by the user interface;

a game server connected to the user interface through the communications network to provide interactive communication with the player, said game server presenting to the player at least one game which the player may select, based on sequential decision points having multiple choices at each of said decision points, and further comprising:

a game processor operative in association with a program to provide a game medium for use by said game server, said game medium having a set of graphical displays for each of said decision points and choices arranged in a structure according to the rules of the selected game;

a data storage unit in which is stored a database containing a product listing, accessible by the player to allow the player to create a product medium having the same structure as the game medium by selecting products from said listing of products to insert into the game medium structure; said product medium having symbols representing products selected by the player correlated to said graphical displays of the game;

a game algorithm for each player for converting said game medium into said product medium during the play of the game; and wherein the game processor converts between the game medium and the product medium, thereby allowing the player to play decision point style games using the product medium, while the game server plays the game using said game medium, and wherein said game algorithm converts between said product medium and said game medium during said play.

* * * * *